US008432825B2

(12) United States Patent
Balasaygun et al.

(10) Patent No.: US 8,432,825 B2
(45) Date of Patent: Apr. 30, 2013

(54) SWITCHING COMMUNICATIONS BETWEEN DIFFERENT NETWORKS BASED ON DEVICE CAPABILITIES

(75) Inventors: Mehmet C. Balasaygun, Freehold, NJ (US); Joel M. Ezell, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 251 days.

(21) Appl. No.: 12/791,662

(22) Filed: Jun. 1, 2010

(65) Prior Publication Data

US 2011/0044184 A1 Feb. 24, 2011

Related U.S. Application Data

(60) Provisional application No. 61/235,838, filed on Aug. 21, 2009.

(51) Int. Cl.
*H04J 1/16* (2006.01)
(52) U.S. Cl.
USPC .......................................................... 370/252
(58) Field of Classification Search .................. 370/230, 370/352, 252, 241, 329, 253, 400, 401, 270, 370/277, 338, 328, 398, 312, 310.2, 908, 370/491; 544/67.11, 445, 434; 379/265.06
See application file for complete search history.

(56) References Cited

U.S. PATENT DOCUMENTS

| 6,650,899 | B1 | 11/2003 | Stümpert | |
|---|---|---|---|---|
| 6,807,150 | B1 * | 10/2004 | McNiff et al. | 370/230 |
| 7,664,501 | B2 * | 2/2010 | Dutta et al. | 455/436 |

OTHER PUBLICATIONS

Gazis et al. "Evolving perspectives of 4th generation mobile communication systems." IEEE Personal, Indoor and Mobile Radio Communications, Sep. 15, 2002, 11 pages.
Kassar et al. "An overview of vertical handover decision strategies in heterogeneous wireless networks." Elsevier Computer Communications, Jun. 25, 2008, vol. 31, No. 10, pp. 2607-2620.
Marques et al. "An IP-based QoS architecture for 4G operator scenarios." IEEE Wireless Communications, Jun. 2003, pp. 54-62.
International Search Report for International (PCT) Patent Application No. PCT/US2010/044124, mailed Feb. 22, 2011 3 pages.
Written Opinion for International (PCT) Patent Application No. PCT/US2010/044124, mailed Feb. 22, 2011 3 pages.
International Preliminary Report on Patentability for International (PCT) Patent Application No. PCT/US2010/044124, mailed Mar. 1, 2012 5 pages.

* cited by examiner

*Primary Examiner* — Chi Pham
*Assistant Examiner* — Alexander O Boakye
(74) *Attorney, Agent, or Firm* — Sheridan Ross P.C.

(57) ABSTRACT

Methods and systems provided herein allow a communication session to be established on an optimal communication network and subsequently transferred to alternative networks if conditions dictate that such a change is necessary or desirable. The types of conditions which may be considered when identifying the optimal communication network or the alternative network include conditions related to the operation of a user device, communication profiles of the user, resources available on other networks, and the like.

19 Claims, 5 Drawing Sheets

SWITCHING COMMUNICATIONS BETWEEN DIFFERENT NETWORKS BASED ON DEVICE CAPABILITIES

CROSS-REFERENCE TO RELATED APPLICATIONS

This application claims the benefit of U.S. Provisional Application No. 61/235,838, filed Aug. 21, 2009, the entire disclosure of which is hereby incorporated herein by reference.

FIELD OF THE INVENTION

The present invention is generally directed toward communications and more specifically toward switching communications between networks.

BACKGROUND

As users start to use multiple networks for communicating, the potential for disparities in the capabilities of the networks and/or devices exist. For example, Private Branch eXchange (PBX) switching communications provide rich network centric switching capabilities whereas P2P (P2P) networks provide limited device centric capabilities. This is because P2P networks require that most of the processing and communication capabilities reside in the communication devices; many communication devices may not have dedicated communication hardware, thus resulting in degradation as the processing resources are used up. Moreover, some devices only support limited capability such as audio only, while other devices may support audio, video, and other capabilities.

Various conditions such as network failures, device failures, dropping below a predetermined Quality of Service (QoS) level, lack of processing resources in a communication device, and other conditions can cause communications to become intolerable. Accordingly, there exists a need to facilitate network switching in response to these problems. Unfortunately, existing solutions fail to take into account the current capability of a communication device when deciding to switch the communication session to a different network. Moreover, existing solutions also fail to account for alternative networks by identifying domains and service providers to which the user or endpoint belongs. Most specifically, existing solutions tend to be network centric when determining whether to switch a communication session to a different network. Failure to consider conditions other than network conditions may result in sub-optimal network selection and switching decisions.

SUMMARY

It is with respect to the above issues and other problems that the embodiments presented herein were contemplated. Embodiments of the present invention propose enhanced switching mechanisms.

One aspect of the present invention is to provide a better switching mechanism between network centric solutions (e.g., Enterprise) and P2P solutions. The switching mechanisms described herein account for device attributes such as processing capacity (total and current), supported protocols, device capabilities, device hardware, domain to which the device is current enrolled (i.e., what network(s) or service provider(s) the device is calling from and connected with), potential domains to which the device may enroll (e.g., networks or service providers to which a user of the device has a subscription), and the like when determining which network to use and/or switch to.

In accordance with at least some embodiments of the present invention, the switching can be done at any time before and/or during a communication. A communication can be any type of communication such as an audio communication, a video communication, a text communication, a multimedia communication, a video stream, an audio stream, and the like. The communication can also be various combinations of the above and may vary over the life of the communication.

In some embodiments, a user may have a predefined QoS for calls made to a specific person or a specific QoS for all calls. During the initial call to the person or after the call is setup, the mechanisms proposed herein can not only look at the QoS of the different networks, but also look at capabilities of the communication devices involved in the communication. For example, if a specific form of P2P Voice over Internet Protocol (VoIP) call is made and one of the communication devices becomes heavily loaded and has to drop to a lower quality coding, the mechanisms proposed herein can switch the communication to the Enterprise network (e.g., a traditional network centric network, a VPN, or the like) based on the changing characteristics of one or more of the communication devices. Switching to the different network can offload the previously overburdened communication device of things like mixing, signaling, coding, and the like, thereby reducing the need for more resources.

The mechanisms proposed herein can also detect when the communication device's processing resources can meet the QoS requirements and then switch back to the P2P network. Switching networks can be done on a variety of factors such as cost, QoS, the type of communication, device capabilities, Quality of Experience (QoE), time of day, user preferences, and combinations thereof. For example, the P2P network may be cheaper the Enterprise/VPN solution. The mechanisms can look at additional factors like least cost routing, country codes, service provider costs, internal costs, protocols used, combinations thereof, and the like to help determine when a communication should be switched from one network to another different network.

One way to switch between networks during an active communication is to create a second communication in the second, alternative, network and switch before tearing down the existing communication in the first network. If a P2P conference call is transferred to an enterprise network, the communication can be referred to a mixing resource or multiple resources within the enterprise and a conference can then setup in the enterprise network. Thereafter, the communication can be switched to the enterprise network. A similar mechanism can be used to switch a conference from an enterprise network to a P2P network.

The mechanisms proposed herein can switch a communication session between networks based on a failure or reduction in QoS from a network centric solution. If the network centric solution's QoS drops below a defined threshold, a communication can be switched to the P2P network. In order to meet the required QoS on the P2P network, the communication device can dedicate a specific amount of processing resources in the communication device to meet the user's QoS requirements. A way of doing this could be to dedicate a specific time slice of the communication devices processing resource(s) to the communication. The communication process could be spun off to a specific processor in a multiprocessor system or using other known techniques. By dedicating specific resources to a communication, a specific QoS, coding, and the like can be provided.

Switching networks can also be due to a communication device becoming overloaded based on mixing of additional call participants in a P2P network. As the communication device becomes overloaded due to having to mix additional call participants, the system can switch to the enterprise network where the mixing is done centrally, thus offloading the communication device. The switching can happen for all devices involved in the communication or only a subset of the devices will switch to a different network. Moreover, one subset of devices may switch to a first alternative network while a second subset of devices may switch to a second alternative network. In addition, criteria for switching networks can be based on the communication device having a longer delay in sending packets, dropping packets, and the like.

Another option would be to select a specific network based on the location domains of the devices. For example, if one device is calling from a P2P network and the system may elect to select a pure P2P connection based on a lower cost. The system could select a P2P-to-SIP connection between communication devices based on costs and/or other factors (e.g., the desire to incorporate other call features via the SIP network).

Switching can be done in the communication device, in a network boundary device (e.g., a gateway), within the network(s), and the like. For example, a gateway can monitor packets from the communication device and detect that the communication device is starting to have problems in processing a voice/video call on a P2P network. The gateway can then inform the communication device to switch to a different network based on network criteria, capabilities of the other device(s) involved in the communication, and the like.

Another option would be to provide the ability to switch networks at the beginning of a communication using handles from one network and creating a communication on a different network. For example, user A and user B both have enterprise handles and P2P handles (i.e., subscriptions to two different networks, but each user subscribes to the same two networks). If user A tries to make a enterprise connection using the enterprise handles of user A and user B, but based on the mechanism detecting a need to switch the communication to the P2P network, the system would get the P2P handles and then create a communication on the P2P network from user A to user B. Another alternative would be where user A tries to call user B using enterprise handles. The system would switch user A to the P2P network based the system detecting a need to switch networks and; the system would then initiate a communication from the P2P network. The P2P communication would arrive at the proper gateway to bring the communication to user B back into the enterprise network. The reverse of both of these could occur as well.

In accordance with at least some embodiments of the present invention, a method is provided that generally comprises:

monitoring characteristics of a user device involved or about to be involved in a communication session with another user device;

based on the monitored characteristics of the user device, identifying a second network for carrying the communication session; and performing one of the following:

(i) establishing the communication session on the second network; and (ii) switching the communication session from a first network to the second network.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "stalking" means the process of determining a person is presently using a social media network and can be contacted on that social media network in real time.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
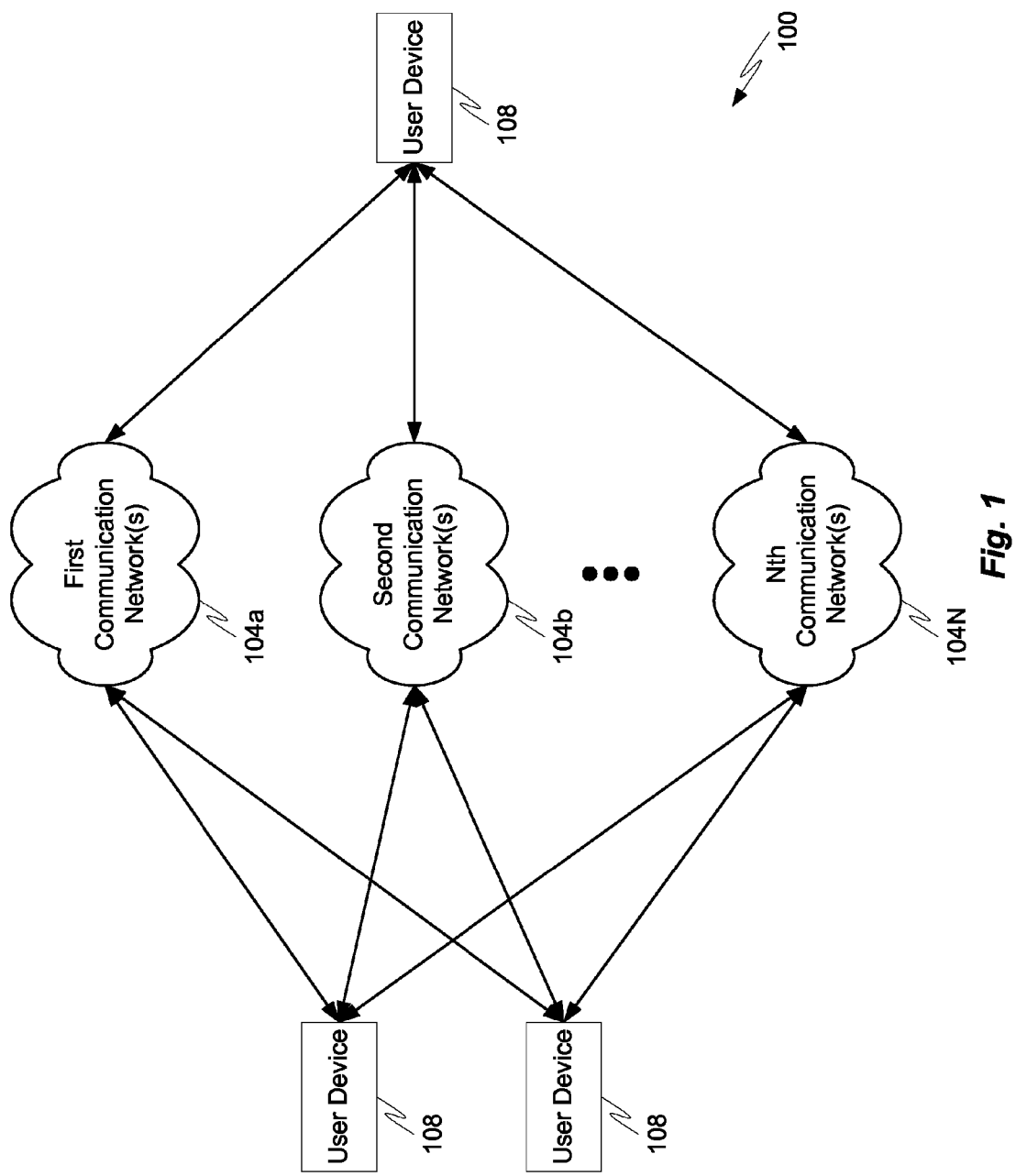
FIG. 1 is a block diagram of an embodiment of a communication system in accordance with embodiments of the present invention.

A communication system 100, for facilitating communication sessions between user devices is shown in FIG. 1. The communication system 100 can include one or more user devices 108 in communication via one or more communication networks 104a-N.

The user devices 108 can be any suitable circuit- or packet-switched or digital (e.g., TDM-enabled) communication device. Examples include wired and wireless telephones, Personal Digital Assistants (PDAs), Personal Computers or PCs, laptops, packet-based H.320 video phones and conferencing units, packet-based voice messaging and response units, peer-to-peer based communication devices, cellular phones, smartphones, packet-based traditional computer telephony adjuncts, and combinations thereof.

The networks 104a-N may comprise any type and any number of communication mediums and devices which are capable of supporting communication sessions, such as voice calls, video calls, chats, emails, chats, TTY calls, multimedia sessions, or the like. Each of the networks 104a-N may be provided and maintained by different network service providers. Alternatively, two or more of the networks 104a-N may be provided and maintained by a common network service provider or a common enterprise in the case of a distributed enterprise network.

As one example, the first network 104a may correspond to a P2P network or communication provided by a P2P communication provider such as Skype. Such a network may be established directly between two user devices 108 via the Internet according to known methods and protocols. A P2P network may also be utilized to facilitate a conference call between three, four, five, or more user devices 108. In such an embodiment, the mixing of audio from the various user devices 108 may be performed at one or more user devices 108, rather than by a network device, such as a conference server.

As another example, the second network 104b may correspond to an enterprise network. When embodied as an enterprise network, the network may include a Local Area Network (LAN) or a number of interconnected networks such as a number of LANs separated by a public network, thereby forming a Wide Area Network (WAN), where some or all of the LANs may comprise an enhanced IP-based network, such as a Session Initiation Protocol (SIP) network, and any other type of packet-switched network known in the art. The type of network or networks which interconnect the LANs of the enterprise network may include one or more of the Internet, the Public Switched Telephone Network (PSTN), an Integrated Serviced Digital Network (ISDN), or the like. In addition, it can be appreciated that the enterprise network need not be limited to any one network type, and instead may be comprised of a number of different networks and/or network types.

One or more of the networks 104a-N may alternatively, or additionally, include an IP Multimedia Subsystem (IMS) network or any other type of network which provides access to one or more of the Internet, a standard Plain Old Telephone System (POTS), an ISDN, the PSTN, any type of known cellular communication network (e.g., 3G, 4G, etc.), or combinations thereof.

Another type of network which may be included in the networks 104a-N is the Internet. A user device 108 may be connected to the Internet either through a wired or wireless connection by utilizing one or more Internet access points. Alternatively, a user device 108 may connect to another type of network, such as an enterprise network via an access point.

Figure 2:
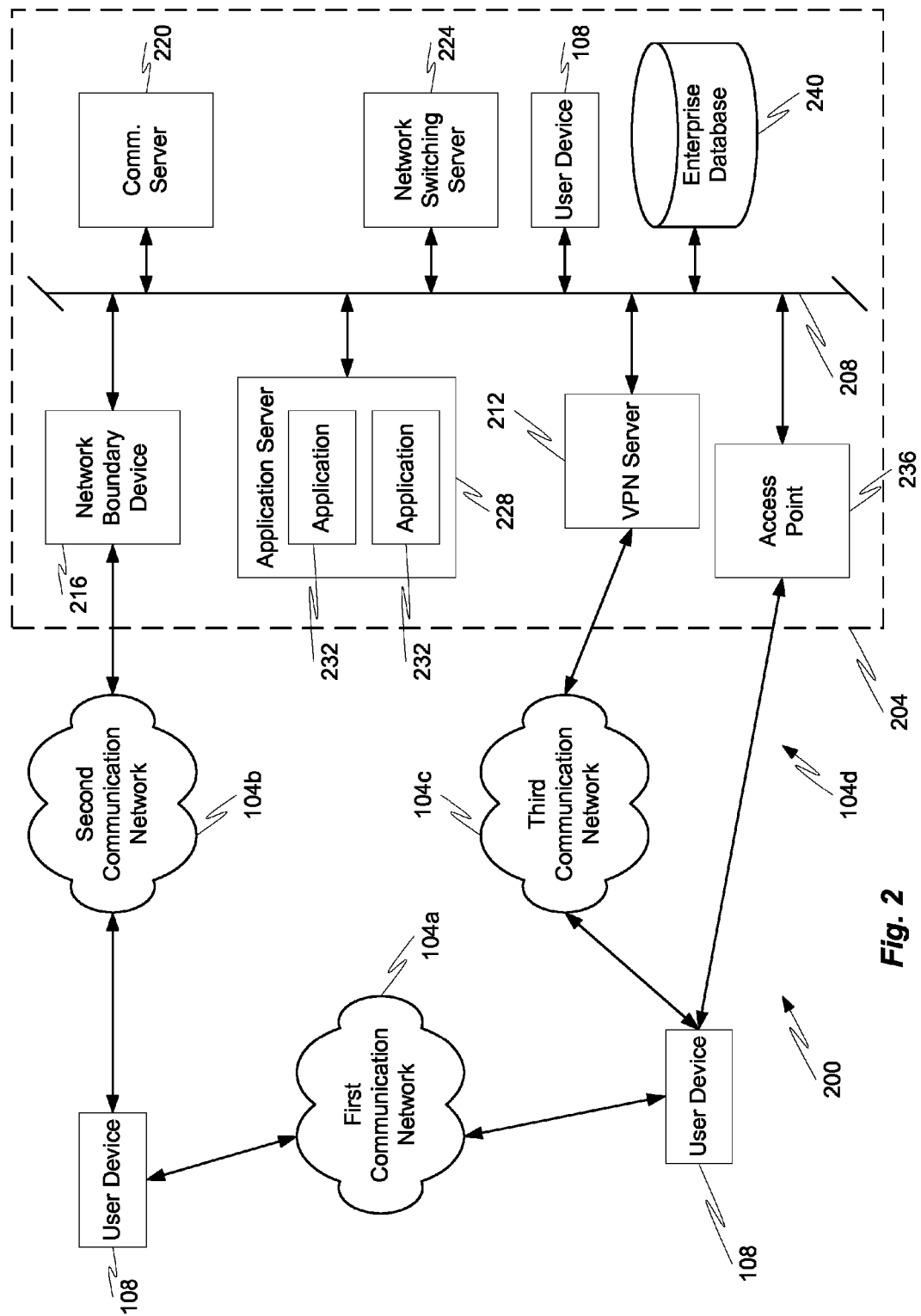
FIG. 2 is a block diagram depicting details of a communication system in accordance with embodiments of the present invention.

FIG. 2 depicts further details of an exemplary communication system 200. The communication system 200 is similar to the communication system 100 depicted in FIG. 1, except that additional details of an enterprise network 204 are depicted. As can be seen in FIG. 2, an enterprise network 204 may serve as one mechanism for interconnecting two user devices 108. Although the user devices 108 may connect with one another via the first communication network 104a, the enterprise network 204 provides an alternative for interconnecting the user devices 108.

In some scenarios, user devices 108 may be interconnected to one another via a second communication network 104b, a third communication network 104c, and the enterprise network 204. In such a scenario, the combination of networks may be referred to collectively as an alternative network to the first communication network 104a.

Alternatively, a user device 108 may belong to the enterprise network 204 in which case the user device 108 connects with other user devices 108 via one or more external communication networks, unless the other user devices also belong to the enterprise network 204 in which case the user devices 108 can connect with one another via the LAN 208 of the enterprise network 204. Alternatively, or in addition, the enterprise network 204 may be configured in the form of a TDM enterprise network rather than solely relying on the existence of a LAN 208.

In addition to user devices and the LAN 208 (or multiple LANs as discussed above), the enterprise network 204 may further include a Virtual Private Network (VPN) server 212, a network boundary device 216, a communication server 220, a network switching server 224, an application server 228 providing one or more applications 232, an access point 236, and an enterprise database 240.

The LAN 208 may be considered a secure LAN by virtue of the fact that the network boundary device 216 and/or access point 236 comprises security mechanisms, which enable only trusted communications to enter the enterprise network 204. For instance, the network boundary device 216 may include a firewall that has rules programmed therein for filtering packets and other forms of communication that are received at the network boundary device 216. If a received packet does not pass the firewall rules or is otherwise excluded by the firewall rules, then that received packet is not passed to the LAN 208. Likewise, the access point 236 may be secured by an encryption key or similar security mechanism which limits access through the access point 236 to trusted user devices 108 having the encryption key. For instance, the access point 236 may be secured with Wi-Fi Protected Access (WAP and WPA2) keys, Wired Equivalent Privacy (WEP) keys, Temporal Key Integrity Protocol (TKIP) keys, private keys, public/private key pairs, and the like. A user device 108 which cannot provide the required keys to the access point 236 will be denied access to the LAN 208.

As discussed above, the network boundary device 216 may correspond to a gateway or similar protocol translation device. Another exemplary type of network boundary device 216 includes a Session Border Controller (SBC), which is a device used at the boundaries of domains. SBCs may include the functionality sufficient to allow a domain to exert control over the signaling of a communication session and usually also the media streams involved in setting up, conducting, and tearing down communication sessions. SBCs may also provide measurement, access control, and data conversion facilities for the communications they control.

Whether a gateway, SBC, or other type of boundary device, the network boundary device 216 may comprise functionality which enables communications between computer or communication networks that use different communications protocols. For instance, the network boundary device 216 may enable a SIP-based enterprise network 204 to interconnect with a non-SIP-based communication network such as the second or third communication network 104b, 104c. Alternatively, the network boundary device 216 may enable a packet-based communication network to interconnect with a circuit-based communication network.

The VPN server 212 may facilitate the establishment of a VPN between a user device 108 outside of the enterprise network 204 via the third communication network 104c with the LAN 208. In some embodiments, the third communication network 104c may itself be referred to as a VPN. A VPN is a secure, private communication tunnel between two or more devices across a public network, such as the Internet. The security of the VPN is created by utilizing known encryption algorithms which secure the communications between the external user device 108 and the enterprise network 104.

Establishment of a VPN between an external user device 108 and the LAN 208 can be facilitated by utilizing VPN software on the user device 108 and/or by utilizing the VPN server 212. Accordingly, the VPN server 212 may not be necessary if the user device 108 is properly equipped with VPN software. The VPN server 212 may correspond to a piece of computing software and/or hardware that acts as a gateway for the user device 108 into the LAN 108. Accordingly, the network boundary device 216 and VPN server 212 may be the same device or may be operated on the same server as different modules therein. The VPN server 212 may be enabled to listen for VPN clients (i.e., external user devices 108 attempting to establish a VPN with the enterprise network 204). Generally speaking, a VPN is established when a client initiates a communication to the VPN server 212 and authenticates itself with the VPN server 212. Once authenticated, the client and VPN server 212 agree on an encryption protocol and begin communicating with one another. At this point, the VPN server 212 operates as a portal for the user device 108 to access the LAN 208 and other components of the enterprise network 204. During such communications the user device 108 and VPN server 212 may utilize a mutually agreeable VPN language. Examples of such languages include, without limitation, Point-to-Point-Tunneling-Protocol (PPTP), Layer 2 Tunneling Protocol (L2TP), Internet Protocol Security (IPSec), and combinations thereof.

The communication server 220 is a server which may be used to facilitate communications between user devices 108, incorporate various features into a communication session, or facilitate conferencing services. The communication server 220 can include a PBX, an enterprise switch, an enterprise server, or other type of telecommunications system switch or server. The communication server 220 is preferably configured to execute telecommunication applications such as the suite of MultiVantage™ or Avaya Aura™ applications of Avaya, Inc., including Communication Manager™, Aura Communication Manager™, Avaya IP Office™, and MultiVantage Expressp™.

The communication server 220, in some embodiments, includes one or more conferencing applications and associated hardware, such as MultiPoint Conferencing Units™ (MCU), Unified Conferencing™, Web Conferencing™, IP Office Conferencing™, and/or Meeting Exchange™ of Avaya, Inc. These products typically require the participants to dial into a conference bridge using a predetermined dial-in number and access code to initiate conference sessions, without an operator or advanced reservations. As will be appreciated, these products further provide integrated features such as audio and web conference session management, power point push, document annotation and other annotation tools, text chat, desktop and application sharing, polling with instant tabulation, interactive whiteboard session, and conference session recording and playback of audio and web portions of the conference session. The products can enable streamed video from presenters, such as using a webcam, and provide a roster display of participants, a discussion window that provides keyboard chatting that can be private between participants or broadcast and visible to all participants, a capability that enables a host to promote a participant to host status so the participant can control the conference session, recording and playback of audio and web portions of the conference session, and Lightweight Directory Access Protocol (LDAP) integration of corporate directories and databases (i.e., real-time access to the enterprise database 240). As can be appreciated, one or more of the features provided by the communication server 220 may not necessarily be provided by a user device 108 on its own. This provides one reason why it may be desirable to utilize the enterprise network 204 for a communication session rather than a P2P network; the enterprise network can provide feature offerings to the communication session participants not otherwise available.

While some of the feature offerings of the enterprise network 204 may be provided by the communication server 220, other features may be provided by one or more applications 232 residing on an application server 228. Examples of such applications 232 include, without limitation, an EC-500 (extension to cellular) application, a call setup application, a voicemail application, an email application, a voice application, a video application, a text application, a conferencing application, a call recording application, a communication log application, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be incorporated into a single communication session without departing from the scope of the present invention.

The network switching server 224 may be provided with functionality which enables the real-time switching of a communication session from one network to another network. Moreover, the network switching server 224 may comprise one or more modules which enable it to analyze QoS of a network currently being used for a communication session as well as possible alternative communication networks. The network switching server 224 may also comprise modules for monitoring the characteristics of user devices 108 and the users associated therewith to identify an optimal network for carrying a communication session as well as determine if switching a communication session from one network to another network is desired and/or possible. Additional details of the components which may be included in the network switching server 224 will be described in connection with the user device 108 depicted in FIG. 3, although one skilled in the art will appreciate that some or all of the network-switching functionality depicted in the user device 108 may be incorporated into the network switching server 224.

Figure 3:
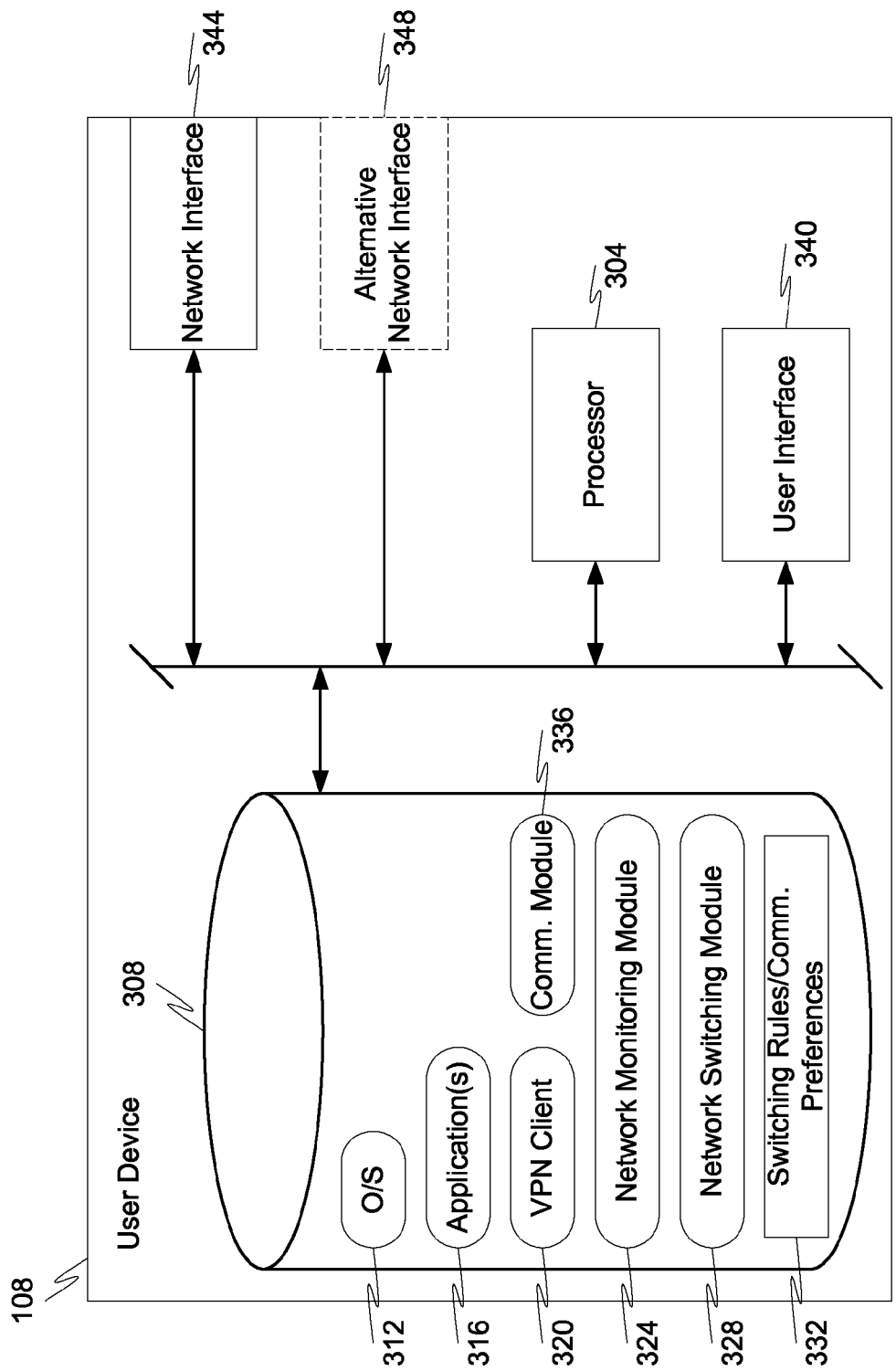
FIG. 3 is a block diagram depicting a user device in accordance with embodiments of the present invention.

The user device 108 depicted in FIG. 3 includes a processor 304, a memory 308, a user interface 340, a first network interface 344, and an optional alternative network interface 348.

The memory 308 may include a number of applications or executable instructions that are readable and executable by the processor 304. For instance, the memory 308 may include instructions in the form of one or more modules and/or applications. The memory 308 may also include data and rules which can be used by one or more of the modules and/or applications. Exemplary applications include an operating system 312 and various other applications 316. The operating system 312 is a high-level application which enables the various other applications 316 and modules to interface with the hardware components (e.g., processor 304, network interface(s) 344, 348, and user interface 340) of the user device 308. The operating system 312 also enables a user of the user device 108 to view and access the applications 316 and modules in memory 308.

Although the applications and modules are depicted as software instructions residing in memory 308 and those instructions are executable by the processor 304, one skilled in the art will appreciate that the applications and modules may be implemented partially or totally as hardware or firmware. For example, an Application Specific Integrated Circuit (ASIC) may be utilized to implement some or all of the functionality discussed herein.

Exemplary types of modules which may be provided in memory 208 include, without limitation, a VPN client 320, a network monitoring module 324, a network switching module 328, and a communication module 336. The memory 308 may also include a communication module 336 which provides the communication functionality of the user device 108. In particular, the communication module 336 may contain the functionality necessary to enable the user device 108 to communicate with other user devices 108 across one or more networks 104*a*-N. As such, the communication module 336 may have the ability to access user communication preferences 332, format communication packets for transmission via the network interface 344 and/or 348, as well as condition communication packets received at a network interface 344, 348 for further processing by the processor 304.

The VPN client 320 may enable the user device 108 to establish a VPN tunnel over a public communication network between the user device 108 and an enterprise network 204. Accordingly, the VPN client 320 may include functionality for securing/encrypting packets prior to transmission via the network interface 344 and/or 348 as well as unsecuring/decrypting packets received at the network interface 344 and/or 348.

The network monitoring module 324 and network switching module 328 may cooperatively operate to identify optimal networks over which a communication session may be established as well as identify when a communication session should be switched from one network to an alternative network. In particular, the network monitoring module 324 may have the ability to monitor both conditions of one or more networks 104*a*-N as well as conditions of the user device 108 to identify optimal networks for supporting a communication session. In some embodiments, the network monitoring module 324 may also be capable of monitoring the conditions of one or more other user devices 108 involved in a communication session with the user device 108 on which the network monitoring module resides 324.

The network switching module 328 may have the ability to communicate with the network monitoring module 324 as well as reference the switching rules 332 to determine whether a communication session should be switched from a first network to an alternative network. Furthermore, the network switching module 328 may be able to identify an optimal network for a communication session before the communication session is established.

The network interface 344 and/or alternative network interface 348 comprise components for connecting the user device 108 to the communication network 104. In some embodiments, a single network interface 344 connects the user device to multiple networks. For example, the network interface 344 may correspond to an Ethernet port which enables the user device 108 to establish a communication session over a P2P network, a VPN, or an unsecured network. In some embodiments, a single network interface 344 connects the user device 108 to one network and the alternative network interface 348 connects the user device 108 to another network. In some embodiments, the network interface 344 corresponds to a wired interface and the alternative network interface 348 corresponds to a wireless interface.

The network interfaces 344, 348 may comprise a communication modem, a communication port, or any other type of device adapted to condition packets for transmission across a communication network 104 to a destination user device 108 as well as condition received packets for processing by the processor 304. Examples of network interfaces 344, 348 include, without limitation, a network interface card, a modem, a wired telephony port, a serial or parallel data port, radio frequency broadcast transceiver, a USB port, or other wired or wireless communication network interfaces.

The user interface 340 may include a user input and/or user output device. The user interface 340 enables a user to interact with the user device 108. Exemplary user input devices which may be included in the user interface 340 comprise, without limitation, a microphone, a mouse, trackball, rollerball, or any other known type of user input device. Exemplary user output devices which may be included in the user interface 340 comprise, without limitation, a speaker, light, Light Emitting Diode (LED), display screen, buzzer, or any other known type of user output device. In some embodiments, the user interface 340 includes a combined user input and user output device such as a touch-screen.

Figure 4:
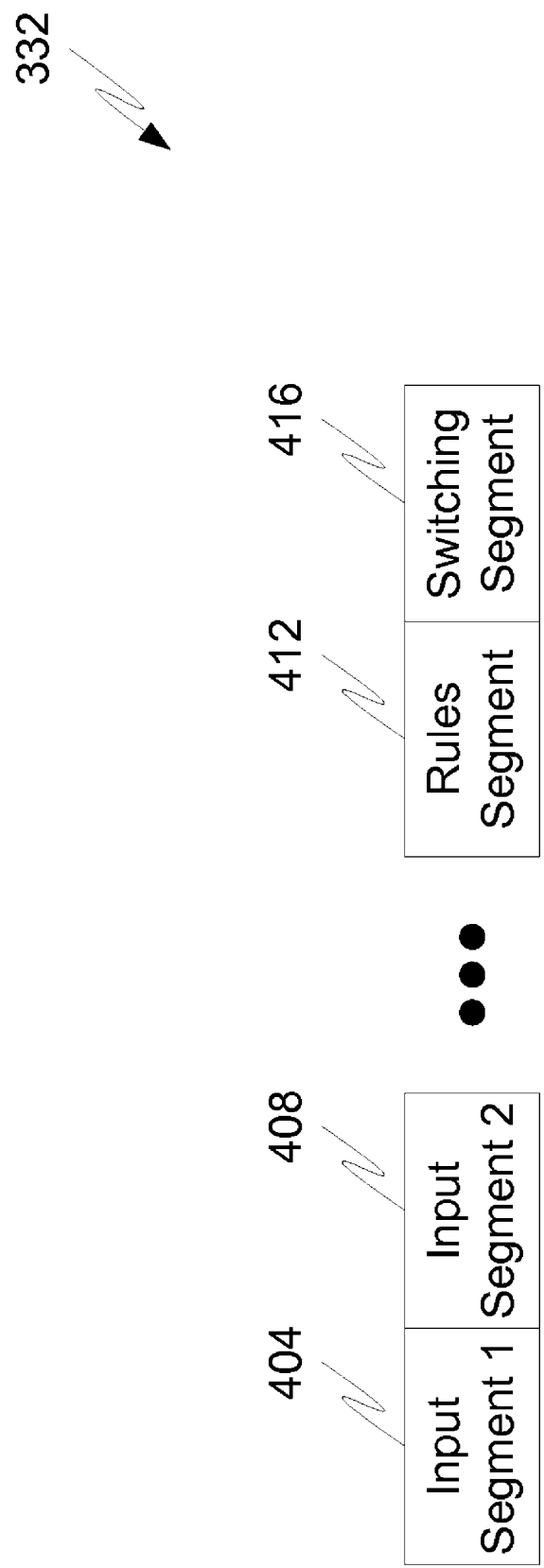
FIG. 4 is a block diagram depicting an exemplary data structure utilized in accordance with embodiments of the present invention.

An embodiment of a switching rules and communication preferences data structure 332 is shown in FIG. 4. The data structure 332 can be stored in several different forms of databases, such as relational databases, flat files, object-oriented databases, etc. Thus, while the term "data field" or "segment" is used, the data may be stored in an object, an attribute of an object, or some other form of data structure. Further, the data structure 332 can be stored, retrieved, sent, or received during the processing communication session information by the network monitoring module 324, network switching module 328, and/or communication module 336. The data structure 332 stores one or more items of information in one or more data fields. The numeric identifiers (e.g. 404, 408, etc.) shown in FIG. 4 can identify, in one or more fields or segments, either the data field or segment or the data stored in the data field or segment.

The data structure 332 can include one or more input segments, such as, input segment 1 404 and input segment 2 408, a rules segment 412, and/or a switching segment 416. Input segments 404 and 408 each include one or more fields comprising the one or more inputs that may be required to determine user communication preferences and/or thresholds for identifying optimal networks for a communication session. The input segments 404 and 408 may include a user identity, a user's outbound call-processing preferences, a user's inbound call-processing preferences, a user's multimedia communication preferences, a user's roaming profile, a user's communication history, a list of contacts, and the like. The input segments 404 and 408 may also include a QoS threshold preferences, a list of user profiles on various communication networks, a list of user profiles with various communication service providers (e.g., a P2P profile), rules for implementing communications via a user's profile, a user's enterprise identity, passwords, encryption keys, etc.

As can be appreciated, the data structure 332 may be stored partially or entirely in one or more servers depicted in FIG. 2. While there are only two input segments 1 404 and 2 408 shown in FIG. 4, there may be more or fewer input segments associated with the data structure 332, as indicated by ellipses.

The rules segment 412 can include one or more heuristic rules that either help with identifying optimal communication networks 104a-N for a communication session and/or identifying alternative communication networks, when necessary. For example, the rule 412 can state that the data structure 332 applies to a communication session only if the communication session includes input segment 1 404 but not input segment 2 408. One skilled in the art will be able to identify other types of rules that may govern the association of the dialog data structure 332 with the social media message. Accordingly, multiple data structures 332, such as those depicted in FIG. 4, may be contained within the switching rules and communication preferences of memory 308. In some embodiments, the rules segment 412 states that if a communication session includes inputs 1 404 and/or 2 408, then the communication module 336, network monitoring module 324, and/or network switching module 328 should respond with a certain type of action or set of actions.

Generally, a switching segment 416 includes a script of actions or responses that direct one or more other components, such as the network monitoring module 324 and/or network switching module 328, to switch a communication session from one network to an alternative network and the conditions required to institute such a switch. The switching segment 416 may also contain instructions for completing the switch of a communication session from one network to an alternative network.

It should be noted that the switching segment 416 can reference one or more other data structures 332. Thus, the switching segment 416 can direct the network monitoring module 324 or network switching module 328 to reference at least one other data structure 332 to further act on a communication session or the like. Further, a communication session can be subject to two or more data structures 332.

Figure 5:
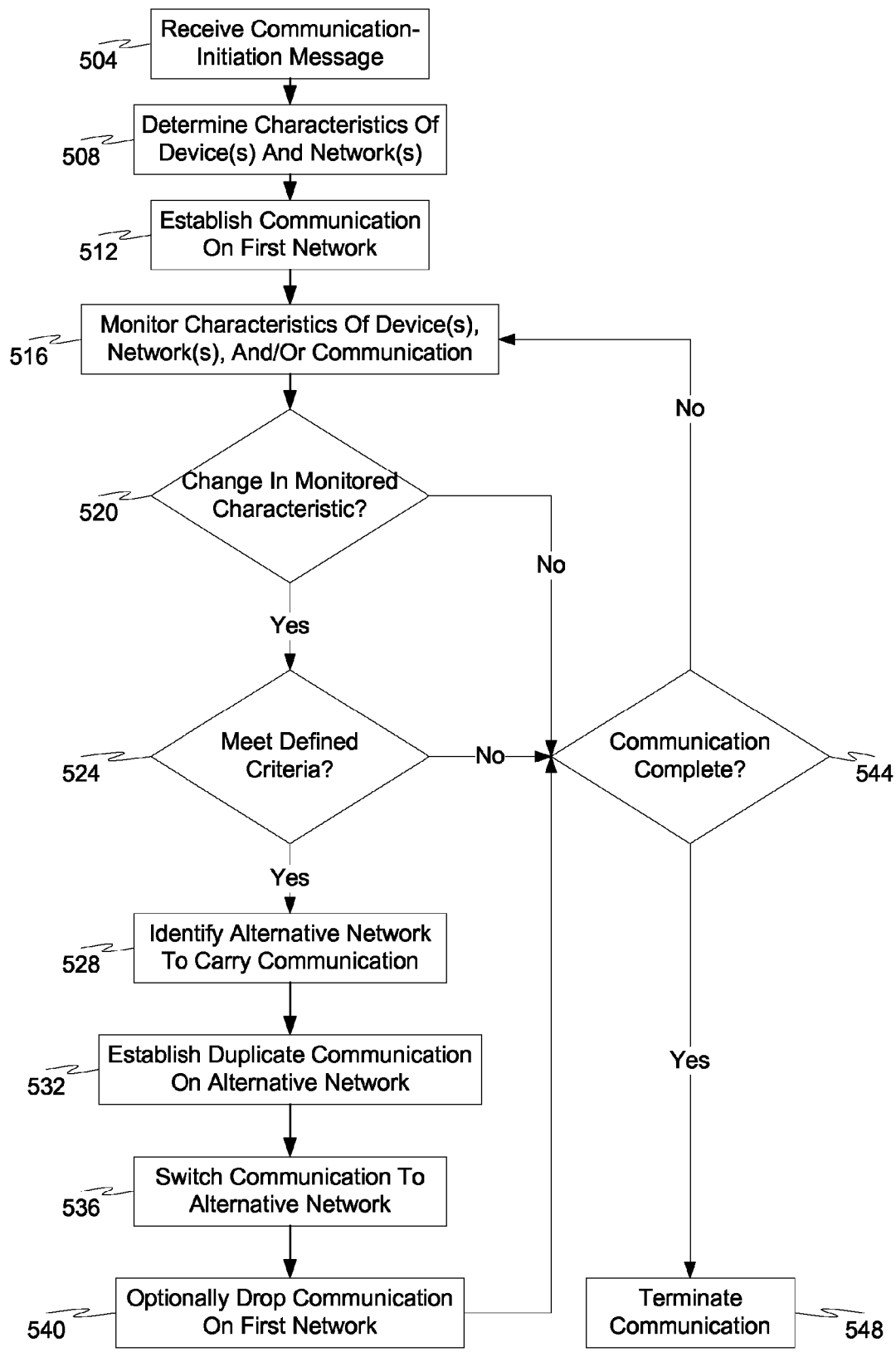
FIG. 5 is a flow diagram depicting an exemplary communication switching method in accordance with embodiments of the present invention.

Referring now to FIG. 5, an exemplary communication method will be described in accordance with at least some embodiments of the present invention. The method is initiated when a communication-initiation message is received by a user device 108 or some other network device responsible for establishing a communication path between two or more user devices 108 (e.g., the network switching server 224) (step 504). The communication-initiation message may be received in the form of a SIP INVITE message or some other message which contains information identifying the initiating user device 108, a targeted user device 108, a targeted group of user devices 108, or a common meeting point for multiple user devices 108 (e.g., whiteboard application, web-conference website, conference bridge, etc.). The identification of such devices may be provided in a header of the communication-initiation message or in some other known format.

The method continues by invoking the network monitoring module 324 to determine characteristics of the device(s) 108 to-be involved in the communication session as well as the potential networks available to host the communication session (step 508). The types of characteristics which may be monitored and determined in this step include, without limitation, user device 108 processing load, user device 108 mixing load, user device 108 memory utilization, user communication profiles, user preferred networks, network QoS, jitter, network cost, packet delay, packet loss, and other network characteristics historically utilized to select an optimal communication network.

Thereafter, the network monitoring module 324 conveys the determined characteristics to the network switching module 328, which references the data structure 332 to identify an optimal network for initially hosting the communication session (step 512). This initially utilized network will be referred to hereinafter as a first network. The first network may correspond to a P2P network, a VPN, a PSTN (e.g., a SIP trunk or non-SIP trunk), a LAN, a WAN, a SIP network, an H.323 network, or any other type of network capable of carrying packets in connection with a communication session.

As an alternative to the above, the communication initiation message may initially arrive over a default network without ever undergoing an optimization decision. In this scenario, the default network may be referred to as the first network. When this occurs, the decision made in step 512 to optimize the networks prior to call establishment may be characterized as a redirect rather than an initial session establishment.

Once the communication session is established, the method continues with the network monitoring module 324 monitoring characteristics of the user device(s) 108 involved in the communication session, user of the user device(s) 108 involved in the communication session, potential other devices (e.g., enterprise network devices) available to participate in the communication session, the first network, potential other networks available to participate in the communication session, and the communication session itself (step 516).

As these various entities are monitored, the network switching module 328 may continuously or periodically determine whether it is necessary or desirable to switch the communication session to an alternative network. This decision may be made by first determining whether there has been a change in one or more of the monitored characteristics (step 520). If this query is answered affirmatively, then the network switching module 328 may further determine if the changes in the criteria meet predefined criteria established to identify that a network switch is desirable (step 524). As can be appreciated, the network switching module 328 may refer to the data structure 332 to determine if the communication session should be switched to an alternative network.

If this query is also answered affirmatively, then the network switching module 328 identifies the best-suited alternative network to host the communication session (step 528). This alternative network may correspond to a P2P network, a VPN, a PSTN, or any other type of network capable of carrying packets in connection with a communication session. Furthermore, a same physical network may be utilized for the alternative network that was utilized for the first network. The difference between the first network and the alternative network may be that different service providers are used to carry the communication session. For example, the first "network" may correspond to a P2P communication established via a first P2P provider and the alternative network may correspond to a P2P communication established via a different P2P provider. Alternatively, the first network may correspond to a VPN with a first enterprise network 204 and the alternative network may correspond to a VPN with the same enterprise network 204, but a different access point 236 or communication profile is used to establish the VPN.

The identification of a P2P communication as the alternative network may require a couple additional steps as compared to identifying an existing network as the alternative network because a "P2P network", as used herein, is not necessarily a physical network per se. Rather, when a P2P connection is established between two or more users, a WAN, the Internet, or some other existing network infrastructure is leveraged to established a P2P communication between the users. Therefore, for a P2P network to be analyzed as a possible alternative network requires a two step process to be performed. First, a P2P communication session is established and is marked as a quality testing communication session. This communication session may be established in the background by the user devices already involved in the communication session on the first network, thereby minimizing user confusion. After the quality testing communication session has been established, test packets are transmitted via the quality testing communication session to determine the quality of the P2P network and whether it is a suitable alternative network.

Once the alternative communication network has been identified, the method continues with the network switching module 328 invoking the communication module 336 to establish a duplicate communication session on the alternative network (step 532). Once the duplicate communication session has been established, the communication module 336 switches the communication session to the alternative network (step 536). After the communication module 336 confirms that the communication session has been successfully switched to the alternative network, the communication module 336 may optionally drop the communication session on the first network, although this step may not be necessary if the user's communication preferences indicate that a fast switch-back to the first network is desired, if possible and if conditions permit (step 540).

Thereafter, or if one of the queries in steps 520 or 524 are answered negatively, the method continues to step 544 to determine if the communication session is complete (step 544). If the communication session is not completed, then the method returns to step 516. Otherwise, the communication session is terminated and the various resources previously used to facilitate the communication session are released for other uses (step 548).

The method may then either end or return back to step 504 upon receiving another communication-initiation message.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method, comprising: monitoring characteristics of a first user device involved or about to be involved in a initial communication session with a second user device;
   based on the monitored characteristics of the first user device, identifying a second network for carrying a duplicate communication session; and performing the following:

(i) establishing a duplicate communication session on the second network;
(ii) switching the first and second user devices involved in the initial communication session from a first network to the second network; and
(iii) confirming that the first and second user devices have been switched to the duplicate communication session on the second network, wherein the duplicate communication session established on the second network is first established for the purposes of determining that the second network is a suitable alternative to the first network and wherein switching the first and second user devices occurs in response to determining that the second network is a suitable alternative to the first network.

2. The method of claim 1, wherein the second network comprises one or more of a VPN, a P2P network, a PSTN, a LAN, a WAN, a SIP network, and an H.323 network.

3. The method of claim 1, wherein the first network and second network utilize the same physical network but utilize at least one of a different protocol and different network entity.

4. The method of claim 1, wherein the monitored characteristics comprise one or more of user device processing load, user device mixing load, and user device memory utilization.

5. The method of claim 4, wherein the characteristics of all user devices involved in the initial communication session are monitored.

6. The method of claim 4, wherein the monitored characteristics further comprise one or more of user communication profiles and user network preferences.

7. The method of claim 4, wherein characteristics of the first network and second network are monitored in addition to monitoring the characteristics of the first user device.

8. The method of claim 7, wherein the characteristics of the first and second networks comprise one or more of network QoS, jitter, network cost, packet delay, and packet loss.

9. The method of claim 1, wherein (i) is performed, the method further comprising:
monitoring characteristics of the user device involved in the duplicate communication session on the second network;
determining, based on the monitored characteristics of the user device, that the first and second user devices involved in the duplicate communication session is to be switched to a third network;
switching the first and second user devices involved in the duplicate communication session from the second network to a triplicate communication session on the third network; and
confirming that the first and second user devices have been switched to the triplicate communication session on the second network.

10. The method of claim 9, wherein the third network is either the first network or different from the first and second networks.

11. A non-transitory computer readable medium having stored thereon instructions that cause a computing system to execute a communication method, the instructions comprising:
instructions configured to implement monitoring of characteristics of a first user device involved or about to be involved in a first communication session with another second user device;
instructions configured to, based on the monitored characteristics of the first user device, identify a second network for carrying a second communication session; and
instructions configured to cause the following actions to occur:

(i) establish the second communication session on the second network;
(ii) switch the first and second user devices involved in the first communication session from a first network to the second network; and
(iii) confirming that the first and second user devices have been switched to the second communication session on the second network, wherein the second communication session established on the second network is first established for the purposes of determining that the second network is a suitable alternative to the first network and wherein switching the first and second user devices occurs in response to determining that the second network is a suitable alternative to the first network.

12. The non-transitory computer readable medium of claim 11, wherein the second network comprises one or more of a VPN, a P2P network, a PSTN, a LAN, a WAN, a SIP network, and an H.323 network.

13. The non-transitory computer readable medium of claim 11, wherein the monitored characteristics comprise one or more of user device processing load, user device mixing load, and user device memory utilization.

14. The non-transitory computer readable medium of claim 13, wherein the monitored characteristics further comprise one or more of user communication profiles and user network preferences, wherein characteristics of the first network and second network are monitored in addition to monitoring the characteristics of the first user device, and wherein the characteristics of the first and second networks comprise one or more of network QoS, jitter, network cost, packet delay, and packet loss.

15. The non-transitory computer readable medium of claim 10, wherein (ii) is performed and wherein switching the communication session from the first network to the second network comprises:
first, establishing the second communication session on the second network;
second, switching the first and second user devices involved in the first communication session on the first network to the second communication session on the second network; and
third, confirming that the user devices have been switched to the second communication session on the second network.

16. A communication system comprising:
a network monitoring module configured to monitor characteristics of a first user device involved or about to be involved in a first communication session with a second user device;
a network switching module configured to, based on the monitored characteristics of the first user device, identify a second network for carrying a second communication session; and
a communication module configured to cause the following actions to occur:
(i) establish the second communication session on the second network;
(ii) switch the first and second user devices involved in the first communication session from a first network to the second network; and
(iii) confirming that the first and second user devices have been switched to the second communication session on the second network, wherein the second communication session established on the second network is first established for the purposes of determining that the second network is a suitable alternative to the first network and wherein switching the first and second user devices occurs in response to determining that the second network is a suitable alternative to the first network.

17. The communication system of claim 16, wherein the second network comprises one of a VPN and a P2P network and wherein the first network comprises the other of the VPN and P2P network.

18. The communication system of claim 16, wherein the second network comprises one of a VPN and a PSTN and wherein the first network comprises the other of the VPN and PSTN.

19. The communication system of claim 16, wherein one or more of the network monitoring module, network switching module, and communication module reside on the first user device.

\* \* \* \* \*

UNITED STATES PATENT AND TRADEMARK OFFICE
CERTIFICATE OF CORRECTION

PATENT NO. : 8,432,825 B2  
APPLICATION NO. : 12/791662  
DATED : April 30, 2013  
INVENTOR(S) : Mehmet C. Balasaygun et al.

Page 1 of 1

It is certified that error appears in the above-identified patent and that said Letters Patent is hereby corrected as shown below:

In the Claims:

Column 14, line 62, please delete "intial" and insert --initial--.

Column 15, line 19, please insert --wherein a characteristic of the first network is monitored in addition to monitoring the characteristic of the first user device and-- between 'claim 1,' and 'wherein'.

Column 16, line 34, please delete "10" and insert --11--.

Signed and Sealed this  
Ninth Day of July, 2013

Teresa Stanek Rea  
*Acting Director of the United States Patent and Trademark Office*